United States Patent
Scannell et al.

(10) Patent No.: US 10,745,106 B2
(45) Date of Patent: Aug. 18, 2020

(54) STEP HANDHOLD AND SUPPORT

(71) Applicant: Bell Helicopter Textron Inc., Fort Worth, TX (US)

(72) Inventors: Brent Scannell, L'ile-Bizard (CA); Thomas Mast, Carrollton, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 299 days.

(21) Appl. No.: 15/958,045

(22) Filed: Apr. 20, 2018

(65) Prior Publication Data

US 2019/0322353 A1 Oct. 24, 2019

(51) Int. Cl.
 *B64C 7/00* (2006.01)
(52) U.S. Cl.
 CPC ...................... *B64C 7/00* (2013.01)
(58) Field of Classification Search
 CPC ............... B60R 3/02; B64C 1/24; B64C 7/00
 See application file for complete search history.

(56) References Cited

U.S. PATENT DOCUMENTS

| 8,905,354 | B2* | 12/2014 | Griffiths | ............ | B64C 1/24 |
| | | | | | 182/89 |
| 9,221,540 | B2 | 12/2015 | Olive | | |
| 2011/0272524 | A1* | 11/2011 | Gorlich | ............ | B64C 1/24 |
| | | | | | 244/129.6 |

FOREIGN PATENT DOCUMENTS

CN 203612192 U 5/2014

OTHER PUBLICATIONS

Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014. (1 page).
Perry, Dominic, "ANALYSIS: Bell 525 Relentless Cutaway and Technical Description", Flight Global, Flight International, Bell Helicopter, Published Nov. 12, 2014. (8 pages).
EPO Examination Report for EP Application No. 18183431.8 dated Nov. 15, 2019, 5 pages.
EPO Search Report for EP Application No. 18183431.8 dated Oct. 24, 2018, 4 pages.
EPO Examination Report for EP Application No. 18183431.8 dated Nov. 8, 2018, 6 pages.

* cited by examiner

*Primary Examiner* — Richard G Davis
(74) *Attorney, Agent, or Firm* — Patent Capital Group (57) ABSTRACT

A fairing is provided in one example embodiment and may include an apparatus to receive at least one of a foot traffic load and a hand traffic load, wherein the apparatus can include: a step portion that is to receive at least a portion of the foot traffic load; a handhold portion that is to receive at least a portion of the hand traffic load, wherein the handhold portion extends downward from the step portion; and a support structure, wherein the support structure extends downward from of the step portion. The apparatus can include an outer flange attached to the fairing. At least a portion of the step portion the apparatus can be recessed within the fairing at a distance between one inch and three inches from a top surface of the fairing. The handhold portion can include one or more drain holes.

19 Claims, 6 Drawing Sheets

STEP HANDHOLD AND SUPPORT

TECHNICAL FIELD

This disclosure relates in general to the field of aircraft and, more particularly, though not exclusively, to a step handhold and support for an aircraft.

BACKGROUND

In general, an outer mold line (OML) is an aerodynamic outer surface of an aircraft that reduces aerodynamic drag and provides an aerodynamic path for air to flow around the aircraft during flight. The OML includes many contiguous surfaces of different components, cowlings, and/or fairings. Cowling or fairing assemblies can be used for general drag reduction, to provide an aerodynamic flow path from the exterior of the aircraft to aircraft components, and/or for decorative purposes. Some aircraft include cowling or fairing assemblies configured to protect propulsion related components and/or drivetrain components. Inspection and/or maintenance of an aircraft typically involves personnel accessing aircraft components via cowling or fairing assemblies. It may be challenging, however, to access aircraft components without special equipment to gain such access.

SUMMARY

According to one aspect of the present disclosure, a fairing may be provided and may include an apparatus to receive at least one of a foot traffic load and a hand traffic load, wherein the apparatus can include: a step portion that is to receive at least a portion of the foot traffic load; a handhold portion that is to receive at least a portion of the hand traffic load, wherein the handhold portion extends downward from the step portion; and a support structure, wherein the support structure extends downward from of the step portion. The apparatus can include an outer flange attached to the fairing. At least a portion of the step portion the apparatus can be recessed within the fairing at a distance between one inch and three inches from a top surface of the fairing.

In some cases, the handhold portion can extend downward at a distance between 2 inches and 4 inches. A first horizontal surface portion of the step portion can extend between a back side recessed portion of the apparatus and the handhold portion and a second horizontal surface portion of the step portion can extend between the handhold portion and an outer flange along the front side of the apparatus. The apparatus can be made from one or more of aluminum, steel, a metal alloy, fiberglass, reinforced plastic, reinforced fiberglass, and a carbon composite.

The support structure of the apparatus may have a top side, a bottom side, a front side, and a back side. The top side of the support structure can be attached to the step portion of the apparatus and the front side can be attached to the handhold portion of the apparatus. The support structure can include a compressive material attached along the bottom side of the support structure. The compressive material attached along the bottom side of the support structure may not be in contact with a fixed element below the fairing when no foot traffic load or hand traffic load is received by the apparatus and can contact the fixed element below the fairing when at least one of the foot traffic load and the hand traffic load is received by the apparatus.

According to another aspect of the present disclosure, a rotorcraft may be provided and may include a fairing in which the fairing includes a step handhold. The step handhold can include: a step portion that is to receive at least a portion of a foot traffic load; a handhold portion that is to receive at least a portion of a hand traffic load, wherein the handhold portion extends downward from the step portion; and a support structure attached to the step portion and the handhold portion, wherein the support structure extends downward from of the step portion; and a contact element, wherein the support structure is aligned with the contact element. The step handhold can be made from one or more of aluminum, steel, a metal alloy, fiberglass, a reinforced plastic, fiberglass, and a carbon composite.

The support structure includes a compressive material attached along a side of the support structure that is opposite from the step portion of the step handhold. The compressive material is in contact with the contact element when at least one of the foot traffic load and the hand traffic load is received by the step handhold. The compressive material is separated from the contact element by a distance when no foot traffic load or hand traffic load is received by the step handhold. In some cases, the distance can be between 0.020 inches and 0.080 inches. The distance can be designed intentionally to accommodate relative movement between the support structure and the contact element during flight maneuvers that may otherwise introduce unintended load or stress into either element. The contact element can be a transmission mount for the rotorcraft. The support structure can be made from one or more of aluminum, steel, a metal alloy, plastic, reinforced plastic, fiberglass, reinforced fiberglass, and a carbon composite.

In some cases, the step handhold can be a first step handhold on a first side of the fairing and the rotorcraft can include a second step handhold on a second side of the fairing. The first step handhold and the second step handhold can be aft of at least a portion of one or more rotor components of the rotorcraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'along', 'upper', 'lower', 'top', 'bottom', 'beside', and/or other similar terms to describe a spatial relationship between and/or among various components and/or to describe the spatial orientation of aspects of such components, should be understood to describe a relative relationship between and/or among the components and/or a spatial orientation of aspects of such components, respectively, as the components described herein may be oriented in any manner. When used to describe a range of dimensions or other characteristics (e.g., time, pressure, distance, temperature, etc.) of an element, operations, and/or conditions, the phrase 'between X and Y' represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1:
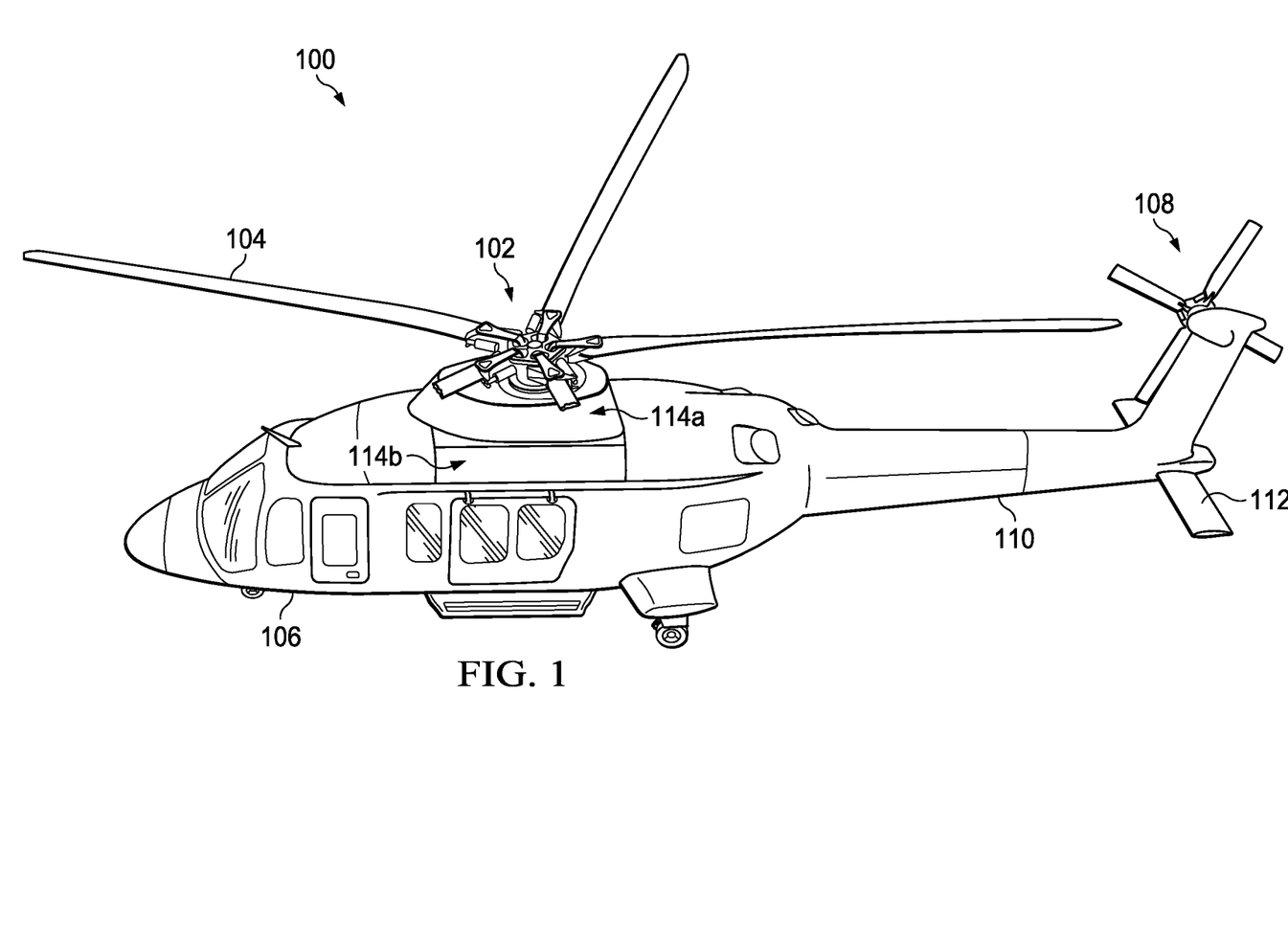
FIG. 1 is a simplified diagram of an example rotorcraft, in accordance with certain embodiments.

FIG. 1 illustrates an example embodiment of a rotorcraft 100. FIG. 1 portrays a simplified side view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, a tail rotor or anti-torque system 108, an empennage 110, and a tail structure 112. The fuselage 106 is the main body of the rotorcraft, which may include a cabin (e.g., for crew, passengers, and/or cargo) and/or may house certain mechanical and electrical components (e.g., engine(s), transmission, and/or flight controls). In the illustrated embodiment, tail structure 112 may be used as a horizontal stabilizer. Torque is supplied to rotor system 102 and anti-torque system 108 using at least one engine and at least one gearbox.

The rotorcraft 100 includes a variety of fairing and/or cowling assemblies configured to cover or protect components of the rotorcraft and reduce aerodynamic drag. An example upper fairing assembly 114a (more generally referred to as upper fairing 114a) is arranged above and/or around unillustrated rotor system 102 components (e.g., swashplates, rotor pitch links, pitch control arms, etc.) and may, at least in part, cover and protect the components. An example lower fairing assembly 114b (more generally referred to as lower fairing 114b) is arranged below the upper fairing 114a. The lower fairing may, at least in part, cover and protect, for example, one or more engines and various drivetrain components. The upper fairing 114a and the lower fairing 114b may further provide relatively smooth outer surfaces that reduce aerodynamic drag experienced by the rotorcraft 100. As referred to herein in this Specification, the terms 'cowling', 'fairing', 'cowling assembly', and 'fairing assembly' may be used interchangeably.

Some fairings can provide access to components for a rotorcraft. The components may be covered (partially or fully) and/or uncovered. For example, some components of the rotor system 102 may be fully or partially covered or exposed by the upper fairing 114a and may be accessible via the fairing. During inspection and/or maintenance of rotorcraft components, a fairing may have loads applied to it by a person (e.g., the weight of the person). Such loads can include loads resulting from foot traffic (referred to herein as 'foot traffic loads') and/or loads resulting from hand traffic (referred to herein as 'hand traffic loads'). Foot traffic loads may be caused by a person walking on, standing on, squatting on, climbing on, kneeling on, and/or otherwise traversing (sometimes referred to as 'scampering') a fairing using one or both feet or one or both knees (e.g., in a kneeling position). For example, a person can kneel, squat, or stand on the upper fairing 114a to access rotors above the fairing and/or rotor system components accessible via the fairing. Hand traffic loads may be caused by a person climbing on, leaning on, kneeling on, grabbing, and/or otherwise traversing a fairing (e.g., upper fairing 114a) using one or both hands. In some cases, other loads can be applied to a fairing such as, for example, components, tools, etc. being sat or places on a fairing during inspection and/or maintenance.

Fairings have, in the past, been constructed of aluminum or other light-weight metals, but are more recently increasingly being constructed from composite materials, such as carbon fiber reinforced polymer (CFRP). Typically, when a fairing is intended to receive foot and/or hand traffic loads, the fairing is designed with reinforcements to bear the entire load of a hand or foot that may be placed on the fairing. Fairing reinforcements are typically provided by 'beefing up' a fairing (e.g., increasing its thickness, dimensions, etc.) and/or integrating structural features such as splines, slats, etc. into the fairing to support various loads. Such reinforcements, however, typically result in added cost and/or weight for such load bearing fairings.

The present disclosure describes various embodiments for providing a fairing that includes a step handhold having a support structure or apparatus attached to the step handhold. The step handhold may include a step portion and a handhold portion. The handhold portion may be integral with the step portion such that the step handhold provides both step and handhold features integrated together in a low profile component. The support structure may extend downward from the step handhold and may align, at least in part, with a fixed contact element beneath the fairing. When there is no loading on the step handhold, the support structure may be separated from (e.g., not touching) the contact element by a given distance. When a load (e.g., a foot and/or hand traffic load) is received by the step handhold, the fairing may flex and the support structure may contact the contact element to create a load path through the support structure to the contact element. A compressive material may be attached to the support structure along the side of the structure that is to be in contact with the contact element. In various embodiments, the contact element may be an engine component (e.g., an engine mount), a transmission component (e.g., a transmission mounting point, mounting system, dampener, etc.), or any other component that may provide a solid surface capable of supporting foot and/or hand traffic loads that may be received by or otherwise imparted on the step handhold.

The distance separating the support structure and the contact element can be designed intentionally to accommodate relative movement between the support structure and the contact element during flight maneuvers that may otherwise introduce unintended load or stress into either element. The distance separating the support structure and the contact element may provide an advantage over a more traditional support mechanism that would only be possible between structural elements that do not have relative movement between elements. For example, the design of the step handhold and support structure described herein may leverage the elastic deformation range of the fairing in which the step handhold is mounted to transfer load only when hand and/or foot traffic load(s) are applied and then the step handhold/fairing can be restored to its original configuration (e.g., with a gap between the support structure and the contact element) when no load(s) are applied in order to accommodate relative movement between the support structure and contact element that may occur during flight maneuvers.

Embodiments described throughout this disclosure may provide numerous other technical advantages including, but not limited to, providing a step handhold that does not require the fairing (to which the step handhold is attached) to be designed or reinforced in order to bear all of the load of one or more hand(s) or one or more feet on the step handhold. Rather, the fairing may be kept intentionally light, thin, etc., which may allow the fairing to flex when a load is received by the step handhold; thereby causing planned contact between the support structure of the step handhold and a contact element below the support structure to create a load path through the support structure and contact element.

Example embodiments associated with a fairing including a step handhold and support structure are described below with more particular reference to the remaining FIGURES. It should be appreciated that rotorcraft 100 of FIG. 1 is merely illustrative of a variety of aircraft in which a step handhold and support structure may be used in accordance embodiments of the present disclosure. Other aircraft in which a step handhold and support structure may be used can include, for example, fixed wing airplanes, hybrid aircraft, unmanned aircraft, gyrocopters, a variety of helicopter configurations, and drones, among other examples.

Figure 2A:
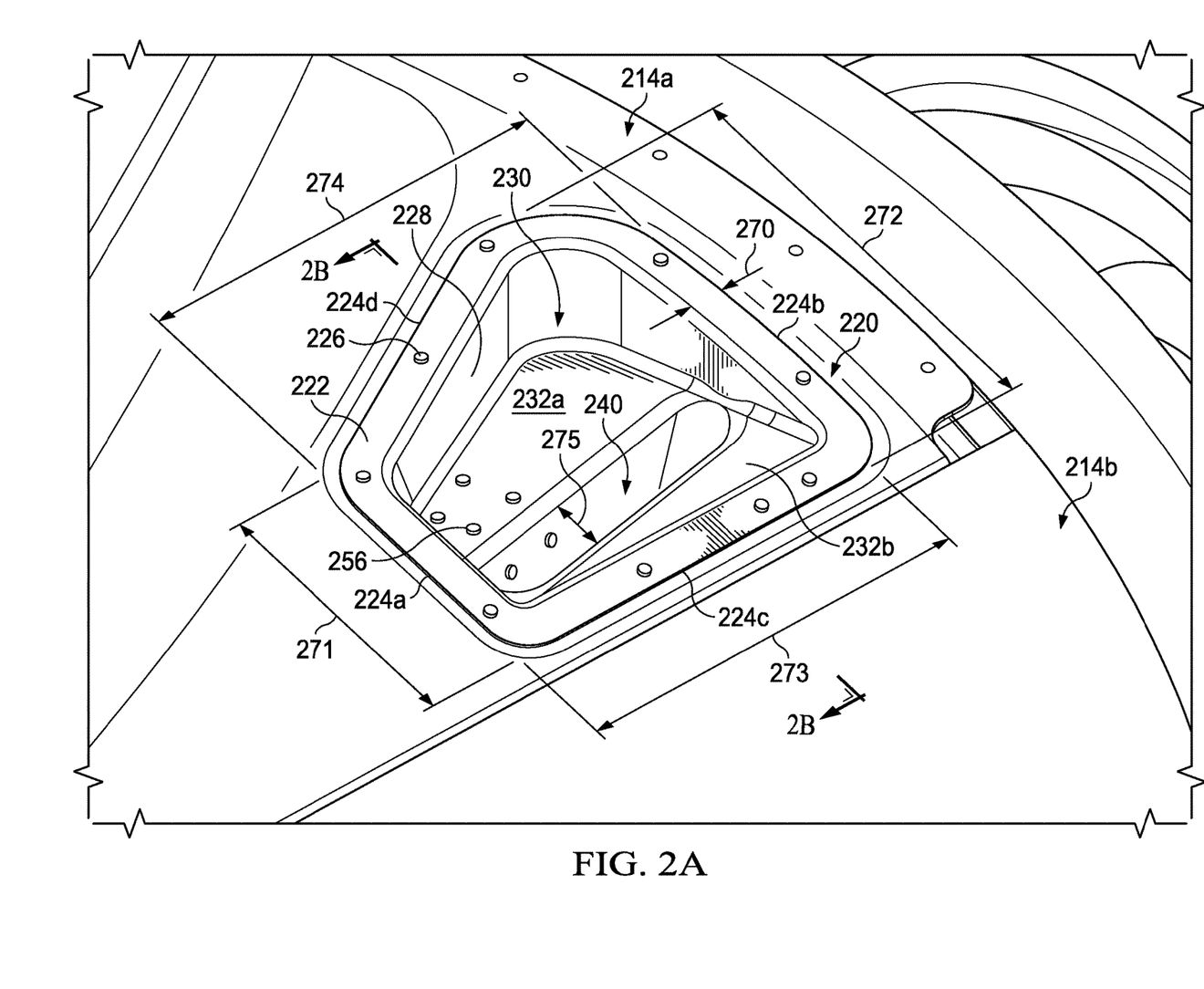
FIG. 2A is a simplified isometric view diagram illustrating example details associated with an example step handhold for a fairing of a rotorcraft, in accordance with certain embodiments.
Figure 2B:
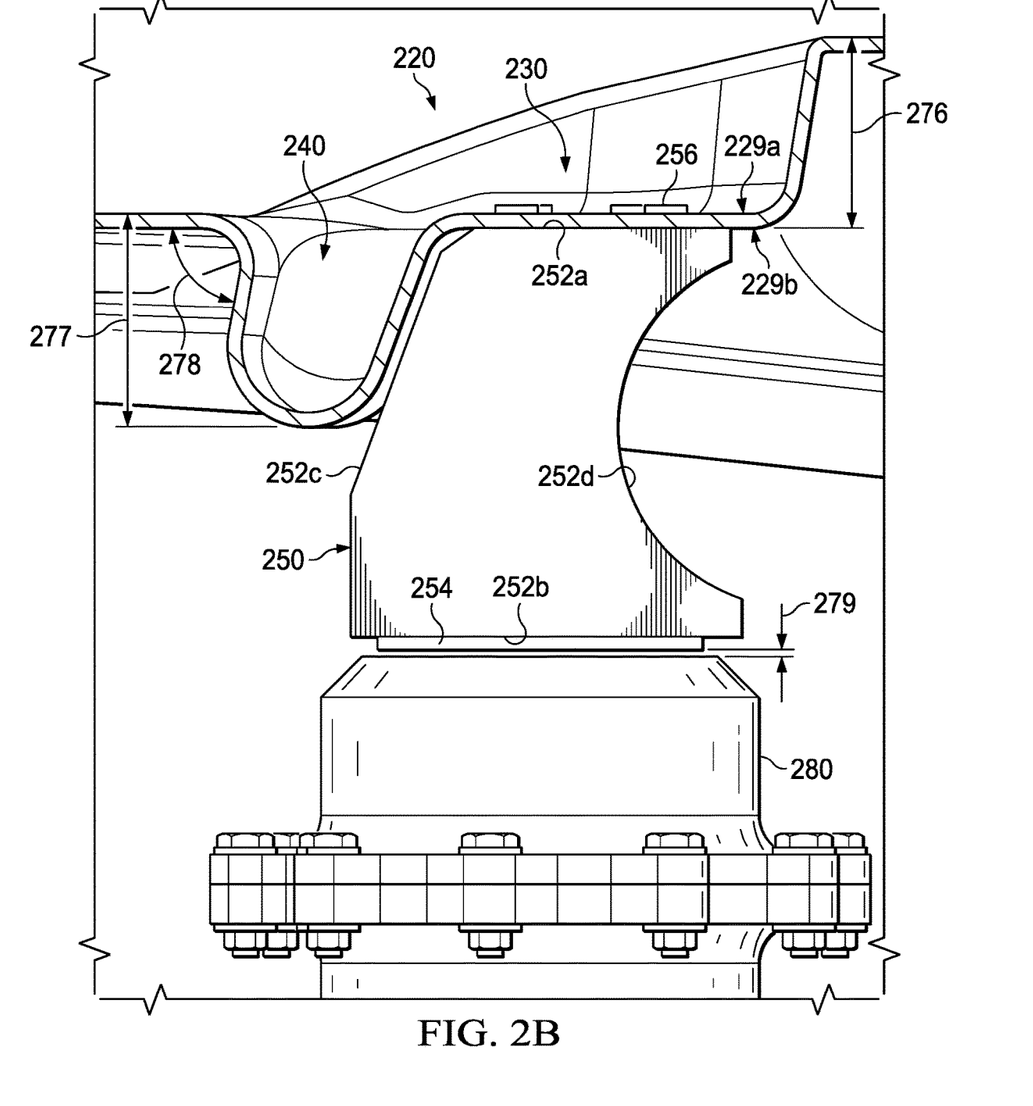
FIG. 2B is a simplified side, cross-sectional view diagram illustrating example details of the example step handhold of FIG. 2A, in accordance with certain embodiments.

Referring to FIGS. 2A-2B, FIGS. 2A-2B illustrate various example details associated with an example step handhold 220 for an upper fairing 214a of a rotorcraft, in accordance with certain embodiments. Referring to FIG. 2A, FIG. 2A is a simplified isometric view diagram illustrating example details associated with an example step handhold 220 for an upper fairing 214a of a rotorcraft, in accordance with certain embodiments. A lower fairing 214b is also illustrated in FIG. 2A. In at least one embodiment, the upper fairing 214a may correspond to upper fairing 114a of the rotorcraft 100 of FIG. 1 and the lower fairing 214b may correspond to the lower fairing 114b of the rotorcraft 100 of FIG. 1. FIG. 2B is a simplified side, cross-sectional view diagram illustrating other example details of the example step handhold 220 of FIG. 2A, in accordance with certain embodiments. The cross-section of FIG. 2B is cut along a line as generally indicated by the lines labeled '2B' in FIG. 2A. The step handhold may be aft of various rotor components for the rotor system (not shown) for the rotorcraft.

As illustrated in FIGS. 2A-2B, step handhold 220 may include various features including, but not limited to, an outer flange 222, a step portion 230, a handhold portion 240, and a support structure 250. The step handhold may include a number of sides 224 including a first (also referred to as 'forward') side 224a, a second (also referred to as 'aft') side 224b, a third (also referred to as 'front') side 224c, and a fourth (also referred to as 'back') side 224d. In various embodiments, the outer flange 222 may be attached to the upper fairing 214a using fasteners 226, which may be spaced along the outer flange 222 around the sides 224a-224d of the step handhold 220, bonding, or a combination thereof.

As illustrated in FIG. 2A, the upper fairing 214a may slope downward (e.g., toward the ground) from the back side 224d of the step handhold 220 toward the front side 224c of the step handhold. The step portion 230 may include a recessed portion 228 along at least three sides of the step handhold (e.g., sides 224a, 224b, and 224d) that may vary in height based on the downward slope of the upper fairing 214a in order to provide a horizontal surface 232 (including a first horizontal surface portion 232a and a second horizontal surface portion 232b) upon which foot traffic may be received by the step handhold 220 (e.g., for stepping, standing, kneeling, squatting, etc. on the step handhold 220). The first horizontal surface portion 232a of the step portion 230 can extend between the back side 224d recessed portion 228 of the step handhold 220 and the handhold portion 240 and the second horizontal surface portion 232b of the step portion 240 can extend between the handhold portion 240 and the outer flange 222 along the front side 224c of the step handhold 220.

The handhold portion 240 may extend between the forward side 224a and the aft side 224b of the step handhold 220 in a lateral manner closest to the front side 224c of the step handhold 220 and may extend downward in a vertical direction from the step portion 230 of the step handhold 220 to provide an area for which hand traffic may be received by the step handhold 220 (e.g., to provide an indentation, trough, or channel that may be used for grabbing, climbing, leaning, etc. on the step handhold 220). In some embodiments, the handhold portion 240 may extend downward from the step portion 230 at an angle 278 that slopes toward the front side 224c of the step handhold 220 to improve the gripping surface of the handhold portion 240. In at least one embodiment, the angle may be approximately 80 degrees relative to the second horizontal surface portion 232b of the step portion 230; however, other angles can be envisioned (e.g., less than, equal to, or more than 90 degrees) depending on manufacturing limitations, applications, implementations, and/or changes in ergonomics (e.g., the ergonomic gripping surface) of the handhold portion 230.

In various embodiments, the handhold portion 240 and/or the step portion 230 may include one or more integral draining mechanisms to allow rain water or other accumulated fluids to be evacuated from surfaces of the step handhold 220. For example, the handhold portion may include one or more small drain holes (not shown) positioned at the lowest point of the handhold portion based on an estimated normal cruising attitude of the rotorcraft to drain any collected fluid from the step handhold 220 during flight. In various embodiments, the diameter of the drain hole(s) may range between 0.125 inches and 1 inch; however, other diameters can be envisioned depending on manufacturing limitations, applications, implementations, etc. For example, the drain hole diameter can be determined as a function of how quickly water can be drained and avoid accumulation in normal operating conditions of the rotorcraft.

As illustrated in FIG. 2B, the step handhold 220 may have a top side 229a and a bottom side 229b. The support structure 250 may be attached to the bottom side 229b of the step handhold 220 using fasteners 256 secured to the support structure 250 via the top side 229a of the step handhold 220. The support structure 250 may extend downward from the step handhold 220 toward a contact element 280. For the embodiment of FIG. 2B, the contact element 280 can be a transmission mounting point (e.g., a mount), dampener, or other fixed, solid surface. It is to be understood, however, that the contact element 280 may be any fixed, solid surface of a rotorcraft that may be capable of supporting foot and/or hand traffic loads that may be received by the step handhold 220 in accordance with various embodiments described herein. The support structure 250 may include a number of sides 252 including a top side 252a, a bottom side 252b, a front side 252c, and a back side 252d. The support structure 250 may also include forward and aft sides, however, these are not illustrated in the embodiment of FIG. 2B for sake of brevity.

Fasteners 256 may be used to attach or otherwise secure the support structure 250 to the step portion 230 of the step handhold 220 along at least a portion of the top side 252a of the support structure 250 and to attach the support structure 250 to the handhold portion 240 along at least a portion of the front side 252c of the support structure 250. For embodiments in which the handhold portion 240 is sloped toward the front side 224c of the step handhold, the support structure 250 may also include a sloped portion along its front side 252c, which may provide an integral surface along which to attach the support structure 250 to the handhold portion 240. Attaching the handhold portion 240 to the support structure 250 may improve structural strength of the handhold portion 240 for horizontal hand traffic loads that may be created by pulling or otherwise grabbing the handhold portion 240. In some embodiments, the back side 252d of the support structure may be contoured to improve load supporting features of the support structure 250 and/or reduce weight of the support structure 250. In some embodiments, the top side of the step portion 230 may be covered with an anti-slip material and/or paint for personnel safety reasons.

A compressive material 254 may be affixed along at least a portion of the bottom side 252b of the support structure 250. The compressive material 254 may cushion contact between the support structure 250 and the contact element 280 when foot and/or hand traffic loads are received by the step handhold 220. When no loads are received by the step handhold 220, the compressive material 254 may not be in contact with (e.g., separated from) the contact element 280 and a gap 279 may be present between the compressive material 254 and the contact element 280. In various embodiments, the gap 279 between the compressive material 254 and the contact element may have a distance ranging between 0.020 inches and 0.080 inches when no loads are received by the step handhold 220. In various embodiments, the compressive material 254 may be a gasket (e.g., bead, bubble, bulb, etc.), a bumper, or any other suitable material capable of cushioning contact between the support structure 250 and the contact element 280, and may composed any suitable material(s) including, but not limited to, rubber and/or any other synthetic material(s) that may be affixed to the bottom side 252b of the support structure 250 using an adhesive or other fastening mechanism.

Figure 3:
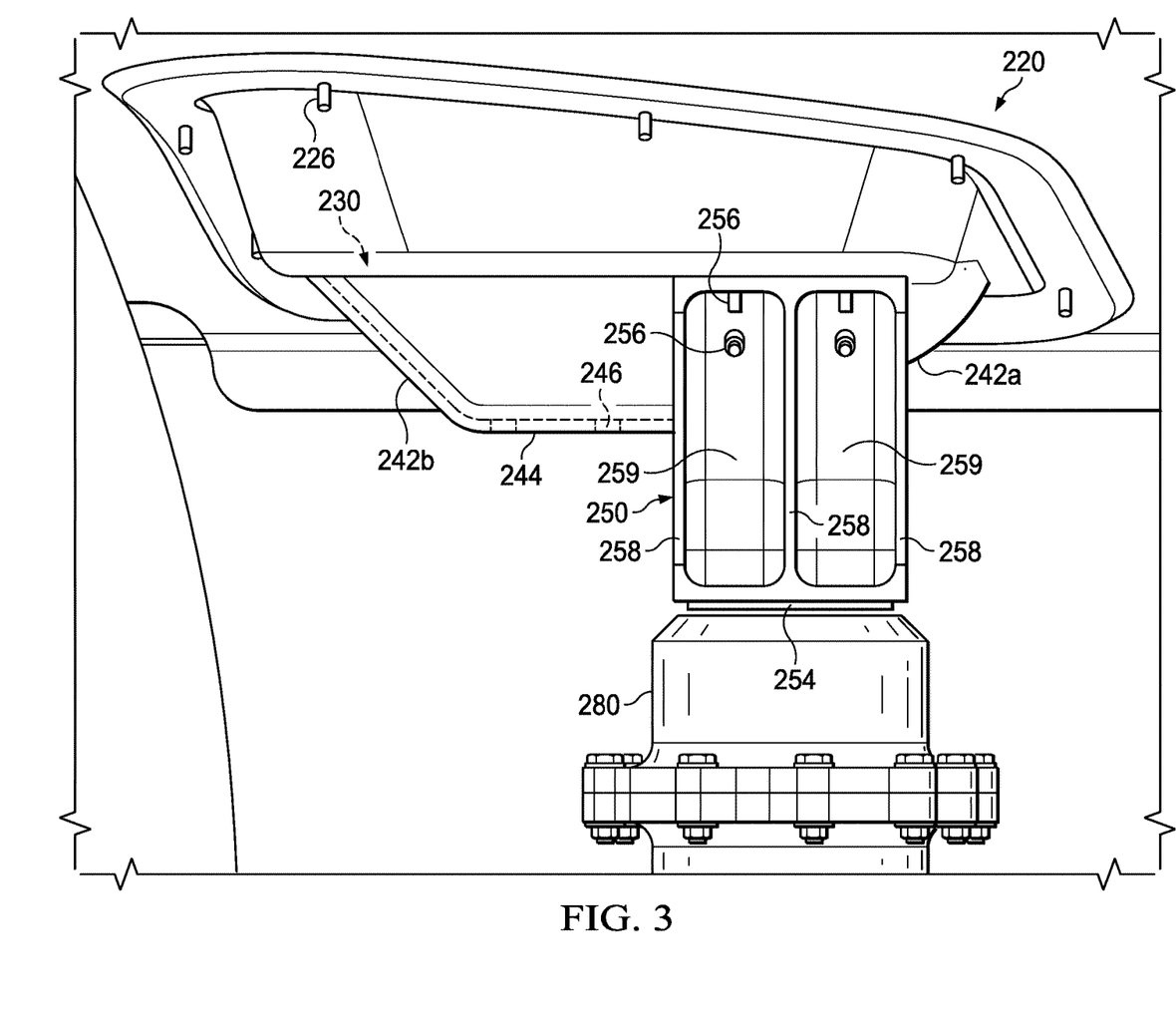
FIG. 3 is a simplified side view diagram illustrating other example details associated with the example step handhold of FIGS. 2A-2B, in accordance with certain embodiments.

The step handhold 220, including support structure 250, may have any suitable dimensions to receive and/or support foot and/or hand traffic loads. In some embodiments, the outer flange 222 may have a width 270 of approximately 0.75 inch (e.g., varying between 0.5 inches and 1.5 inches). In some embodiments, the step handhold forward side 224a may have a length 271 of approximately 6 inches (e.g., varying between 5 inches and 7 inches). In some embodiments, the step handhold 220 aft side 224b may have a length 272 of approximately 8.5 inches (e.g., varying between 7 inches and 10 inches). In some embodiments, the step handhold 220 front side 224c may have a length 273 of approximately 10 inches (e.g., varying between 9 inches and 12 inches). In some embodiments, the step handhold 220 back side 224d may have a length 274 of approximately 11 inches (e.g., varying between 10 inches and 13 inches). In some embodiments, the handhold portion 240 may have an opening width 275 of approximately 1 inch (e.g., varying between 1 inch and 2 inches). In some embodiments, the recessed portion 228 of the step handhold 220 may have a height 276 varying between 0.0 inches and 2 inches (e.g., varying between the front side 224c and the back side 224d of the step handhold between 0.0 inches and 3 inches). In some embodiments, the handhold portion 240 may have a depth 277 of approximately 1.5 inches at its maximum depth (e.g., varying between 1 inch and 3 inches at its maximum depth). In some embodiments, sides of the handhold portion 240 may slope downward (as illustrated in FIG. 3) from the forward and aft sides 224a, 224b of the step handhold 220 toward the maximum depth of the handhold portion 240. Other dimensions for the step handhold 220 can be envisioned in accordance with various embodiments. For example, dimensions of the step handhold 220 can be adapted to ergonomic considerations covering a large range of typical users to accommodate different finger depths (e.g., long and/or short) and/or widths (e.g., gloved and/or ungloved) and/or different foot widths (e.g., for boots, etc.) and/or lengths.

In various embodiments, the step handhold 220 may be composed of any suitable material(s) including, but not limited to, a plastic, reinforced plastic, metal (e.g., aluminum, steel, etc.) and/or metal alloy, rubber, synthetic, fiberglass, reinforced fiberglass, reinforced fiberglass, composite materials (e.g. a carbon composite such as a CFRP), combinations thereof, or the like. In various embodiments, the support structure 250 may be composed of any suitable materials, but not limited to, a plastic, reinforced plastic, metal and/or metal alloy, fiberglass, reinforced fiberglass, composite (e.g., CFRP), combinations thereof, or the like. CFRPs have the advantage of high strength-to-weight ratio, modulus (stiffness to density ratio) that can be 3.5 to 5 times that of steel or aluminum, longer life than metals, higher corrosion resistance, tensile strength that can be 4 to 6 times that of steel or aluminum, and greater design flexibility. Furthermore, the bonded construction of composites such as CFRPs can reduce the number joints and fasteners for each component, making these components easy to repair. In various embodiments, the step handhold 220 may be formed using any suitable process including, but not limited to, metal fabrication and/or machining, compression molding, composite fabrication, or the like. In various embodiments, the support structure 250 may be formed using any suitable process including, but not limited to, metal fabrication and/or machining, compression molding, composite fabrication, combinations thereof, or the like.

In various embodiments, fasteners 226, 256 may be rivets, screws, bolts, combinations thereof, or the like to provide a means for attaching the step handhold 220 to the upper fairing 214a (e.g., via fasteners 226) and for attaching the support structure 250 to the step handhold 220 (e.g., via fasteners 256). In some embodiments, an adhesive and/or co-cured composite may be used in addition and/or in addition to using fasteners 226, 256 to attach the step handhold 220 to the upper fairing 214a and/or to attach the support structure 250 to the step handhold. In some embodiments, outer flange 222 of the step handhold 220 may be recessed within the upper fairing 214a to provide a smooth or otherwise flush surface between the top side 229a of the step handhold 220 and a top surface of the upper fairing 214, which may help to minimize effects of the step handhold 220 on aerodynamics of the rotorcraft. In addition, providing a flush step handhold (e.g., step handhold 22) may provide advantages in cold weather icing conditions. For example, since the step handhold is upstream of the main engine air intakes, any ice that may accumulate on an element that sticks out or otherwise projects from the OML may shed and be ingested by the main engines, which may lead to power interruption and/or unsafe flight conditions.

Referring to FIG. 3, FIG. 3 is a side view diagram illustrating other example details that may be associated with the example step handhold 220 of FIGS. 2A-2B, in accordance with certain embodiments. FIG. 3 illustrates a back side to front side perspective of the step handhold 220 and support structure 250 attached thereto. Fasteners 226, 256 and contact element 280 are also illustrated in FIG. 3.

As illustrated in FIG. 3, the handhold portion 240 may have sides 242, for example a forward side 242a and an aft sides 242b, and a bottom 244. The forward and aft sides 242a, 242b, respectively, may slope downward from the step portion 230 toward the bottom 244. In at least one embodiment, the sloping of the sides 242a, 242b may help to channel fluids towards one or more drain holes 246 (illustrated by the dashed-line boxes) at the bottom 244 of the handhold portion to drain any fluid that may collect in the handhold portion 240 (e.g., during and/or not during flight).

Also illustrated in FIG. 3, the support structure 250 may, in some embodiments, be machined or otherwise fabricated to include rib features 258 and channel features 259. In some embodiments, the rib features 258 along the back side 252d of the support structure 250 (as shown in FIG. 2B) may be contoured to improve load supporting features of the support structure 250 and/or reduce weight of the support structure 250. The channel features 259 may be provided to further reduce weight of the support structure 250 while minimally impacting the ability of the support structure 250 to support foot and/or hand traffic loads.

Although the support structure 250 illustrated in the embodiment of FIG. 3 is shown as being a single structure, it is to be understood that a support structure attached to a step handhold may include any number of support structures or members arranged in any configuration that may enable a load path to be created between a load placed on the step handhold and a contact element beneath the step handhold. Virtually any other support structure configurations may be provided using similar means and methods as those described herein and, thus, are clearly within the scope of the present disclosure.

Figure 4A:
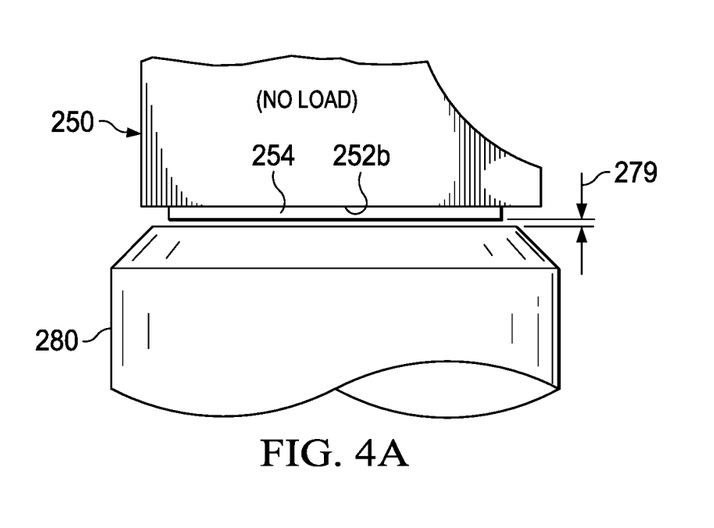
FIGS. 4A-4B are simplified side view diagrams illustrating other example details associated with the example step handhold of FIGS. 2A-2B, in accordance with certain embodiments.
Figure 4B:
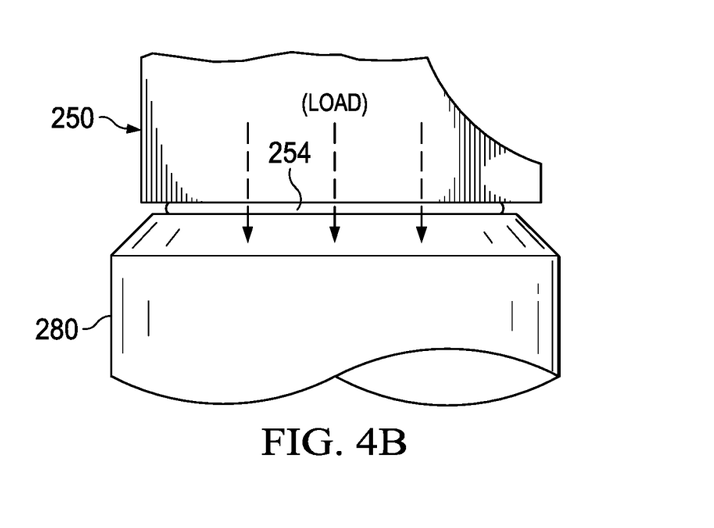

Referring to FIGS. 4A-4B, FIGS. 4A-4B are simplified side view diagrams illustrating other example details that may be associated with the example step handhold 220 of FIGS. 2A-2B, in accordance with certain embodiments. FIGS. 4A-4B include the support structure 250 and the contact element 280. The compressive material 254 is attached to the bottom side 252b of the support structure 250. Although not illustrated in FIGS. 4A-4B, it is to be understood that the support structure 250 is attached to the step handhold 220 (e.g., as illustrated in FIGS. 2A-2B).

Referring to FIG. 4A, FIG. 4A illustrates the compressive material 254 not in contact with the contact element 280 when no load is received by the step handhold 220. The gap 279 between the compressive material 254 and the contact element 280 is present when no load is received by the step handhold.

Referring to FIG. 4B, FIG. 4B illustrates the compressive material 254 in contact with the contact element when a load is received by the step handhold 220. When a load is received by the step handhold 220, a load path (as illustrated by the dashed-line arrows) is created that extends through the support structure 250 and the compressive material 254 and is transferred to the contact element 280.

As referred to herein in this Specification, a foot and/or hand traffic load applied to a step handhold (e.g., step handhold 220) may include the weight of a person. The step handhold 220 and support structure 250 attached thereto can support a load equal to or greater than the full weight of one or more people standing on and/or grabbing the step handhold. The load for a person standing and/or grabbing the step handhold 220 may be estimated based on a 200-pound person and multiplied by a safety factor of about 2.0 or 3.0 (e.g., to account for an impulse load (dynamic loading) created by the person actively stepping on or grabbing the step handhold 220). The load may be applied in an area estimated based on a size and/or portion of the person's foot or hand (e.g., 3-inch by 3-inch square area, or 9 in$^2$). For example, using the safety factor of 2.0, the load is 400 pounds in a 3-inch square area, or about 44.4 pounds per square inch (psi). Alternatively, using the safety factor of 3.0, the load is 600 pounds in a 3-inch square area, or about 66.7 psi. Thus, the step handhold 220 and support structure 250 attached thereto can, advantageously, support at least 66.7 psi (e.g., applied over any 3-inch square area of the step handhold) or a 600 lb point load (applied at any point on the step handhold 220).

Figure 5:
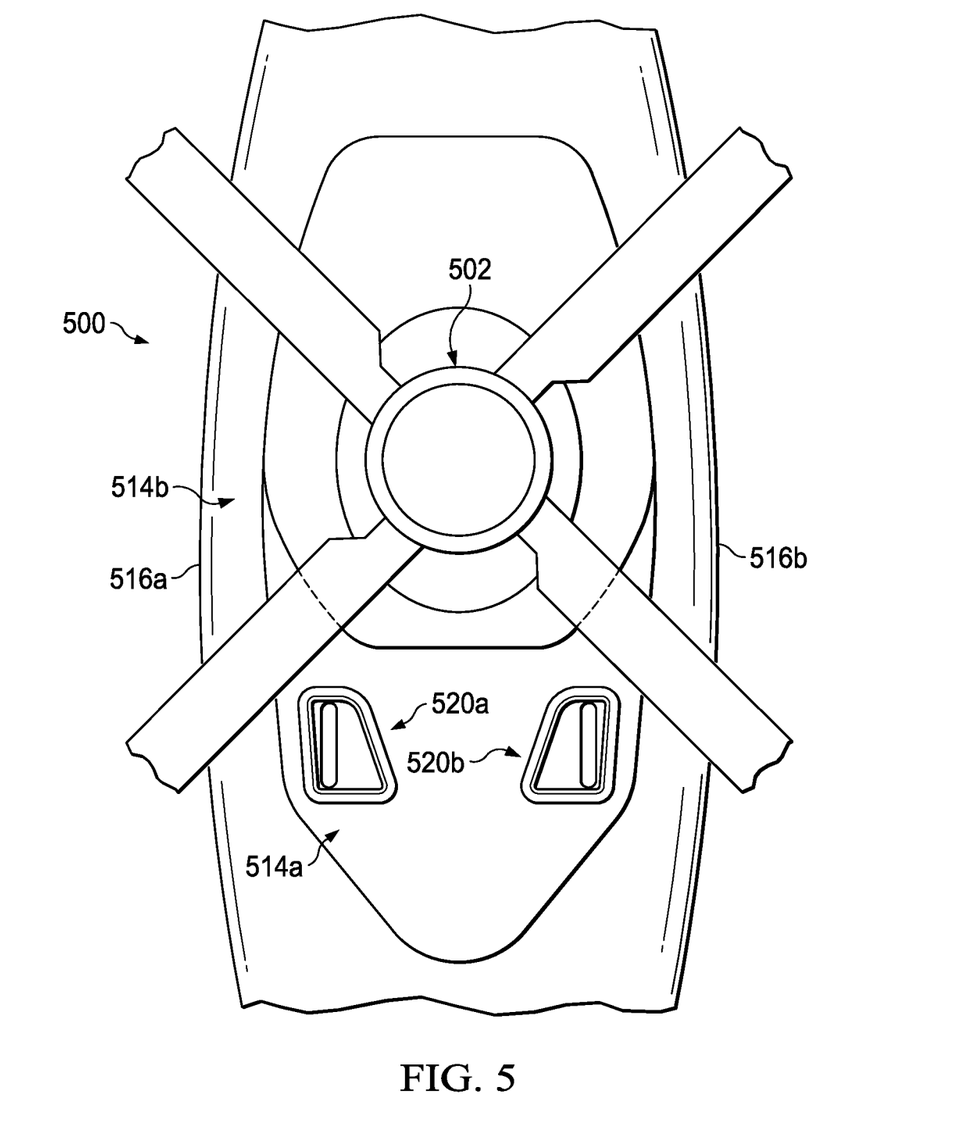
FIG. 5 is a simplified top view diagram of an example rotorcraft having example step handholds on each side of the example rotorcraft, in accordance with certain embodiments.

Referring to FIG. 5, FIG. 5 is top view diagram illustrating example details associated with example step handholds for a rotorcraft, in accordance with certain embodiments. In particular, FIG. 5 illustrates a top view of a portion of a rotorcraft 500 and its rotor system 502. The rotorcraft 500 may include an upper fairing assembly 514a and a lower fairing assembly 514b. The upper fairing assembly 514a may include a first step handhold 520a on a first side 516a of the rotorcraft 500 and a second step handhold 520b on a second side 516b of the rotorcraft 500. The first and second step handholds 520a, 520b may be aft of at least a portion of the rotor system 502 (e.g., the rotor hub, certain rotor controls, etc.) along the sides of the upper fairing 514a of the rotorcraft 500.

The diagrams in the FIGURES illustrate the architecture, functionality, and operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A fairing comprising:
an apparatus to receive at least one of a foot traffic load and a hand traffic load, wherein the apparatus comprises:
a step portion that is to receive at least a portion of the foot traffic load;
a handhold portion that is to receive at least a portion of the hand traffic load, wherein the handhold portion extends downward from the step portion; and
a support structure, wherein the support structure extends downward from of the step portion;
wherein the support structure further comprises a compressive material attached along a side of the support structure that is opposite from the step portion of the step handhold.

2. The fairing of claim 1, wherein the apparatus further comprises an outer flange attached to the fairing.

3. The fairing of claim 1, wherein at least a portion of the step portion of the apparatus is recessed within the fairing at a distance between one inch and three inches from a top surface of the fairing.

4. The fairing of claim 1, wherein the support structure of the apparatus comprises a top side, a bottom side, a front side, and a back side, the top side being attached to the step portion of the apparatus and the front side being attached to the handhold portion of the apparatus.

5. The fairing of claim 1, wherein the compressive material attached along the bottom side of the support structure is not in contact with a fixed element below the fairing when no foot traffic load or hand traffic load is received by the apparatus.

6. The fairing of claim 1, wherein the compressive material attached along the bottom side of the support structure is in contact with a fixed element below the fairing when at least one of the foot traffic load and the hand traffic load is received by the apparatus.

7. The fairing of claim 1, wherein the handhold portion extends downward at a distance between 2 inches and 4 inches.

8. The fairing of claim 1, wherein a first horizontal surface portion of the step portion extends between a back side recessed portion of the apparatus and the handhold portion and a second horizontal surface portion of the step portion extends between the handhold portion and an outer flange along the front side of the apparatus.

9. The fairing of claim 1, wherein the apparatus comprises one or more of aluminum, steel, a metal alloy, fiberglass, reinforced fiberglass, plastic, reinforced plastic, and a carbon composite.

10. The rotorcraft of claim 1, wherein the support structure further comprises a compressive material attached along a side of the support structure that is opposite from the step portion of the step handhold.

11. The rotorcraft of claim 10, wherein the compressive material is in contact with the contact element when at least one of the foot traffic load and the hand traffic load is received by the step handhold.

12. The rotorcraft of claim 10, wherein the compressive material is separated from the contact element by a distance when no foot traffic load or hand traffic load is received by the step handhold.

13. The rotorcraft of claim 12, wherein the distance is between 0.020 inches and 0.080 inches.

14. A rotorcraft comprising:
a fairing, the fairing comprising a step handhold, wherein the step handhold comprises:

a step portion that is to receive at least a portion of a foot traffic load;

a handhold portion that is to receive at least a portion of a hand traffic load, wherein the handhold portion extends downward from the step portion; and a support structure attached to the step portion and the handhold portion, wherein the support structure extends downward from of the step portion; and a contact element, wherein the support structure is aligned with the contact element;

wherein the contact element is a transmission mount for the rotorcraft.

15. The rotorcraft of claim 14, wherein the step handhold comprises one or more of aluminum, steel, a metal alloy, fiberglass, reinforced fiberglass, plastic, reinforced plastic, and a carbon composite.

16. The rotorcraft of claim 14, wherein the support structure comprises one or more of aluminum, steel, a metal alloy, fiberglass, reinforced fiberglass, plastic, reinforced plastic, and a carbon composite.

17. The rotorcraft of claim 14, wherein the step handhold is a first step handhold on a first side of the fairing, the rotorcraft further comprising a second step handhold on a second side of the fairing.

18. The rotorcraft of claim 17, wherein the first step handhold and the second step handhold are aft of at least a portion of one or more rotor components of the rotorcraft.

19. A fairing comprising:

an apparatus to receive at least one of a foot traffic load and a hand traffic load, wherein the apparatus comprises:

a step portion that is to receive at least a portion of the foot traffic load;

a handhold portion that is to receive at least a portion of the hand traffic load, wherein the handhold portion extends downward from the step portion; and a support structure, wherein the support structure extends downward from of the step portion;

wherein a first horizontal surface portion of the step portion extends between a back side recessed portion of the apparatus and the handhold portion and a second horizontal surface portion of the step portion extends between the handhold portion and an outer flange along the front side of the apparatus.

* * * * *